W. V. GILBERT.
RESILIENT COMPOUND LEVER.
APPLICATION FILED SEPT. 15, 1909.
985,755.
Patented Feb. 28, 1911.
3 SHEETS—SHEET 1.
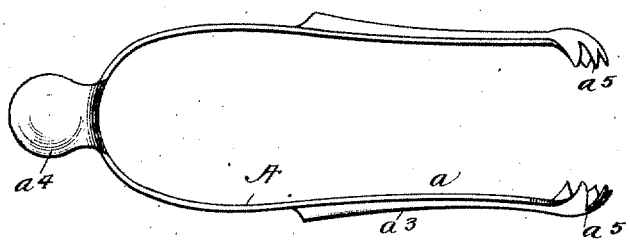
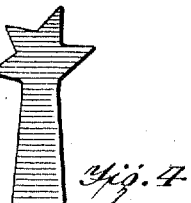
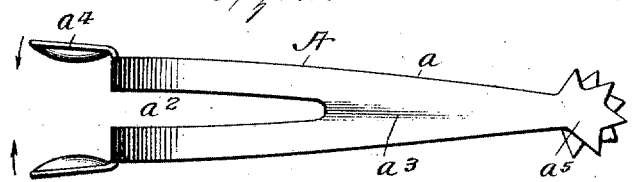
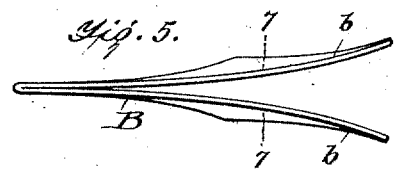
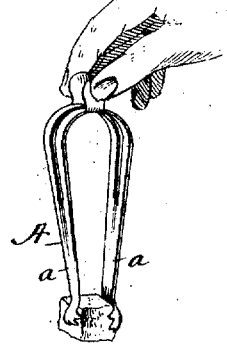
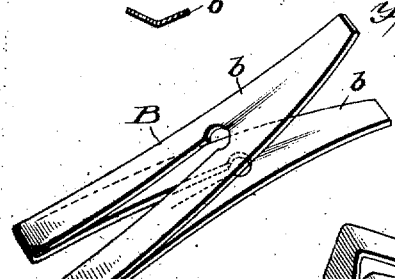
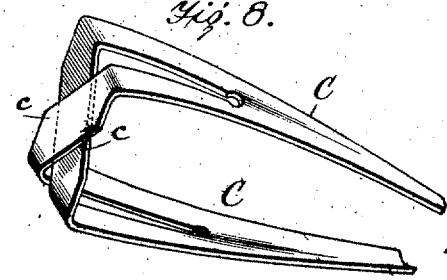
WITNESSES
L. H. Schmidt
Amos W. Hart
INVENTOR
WALTER V. GILBERT,
BY Munn & Co.
ATTORNEYS

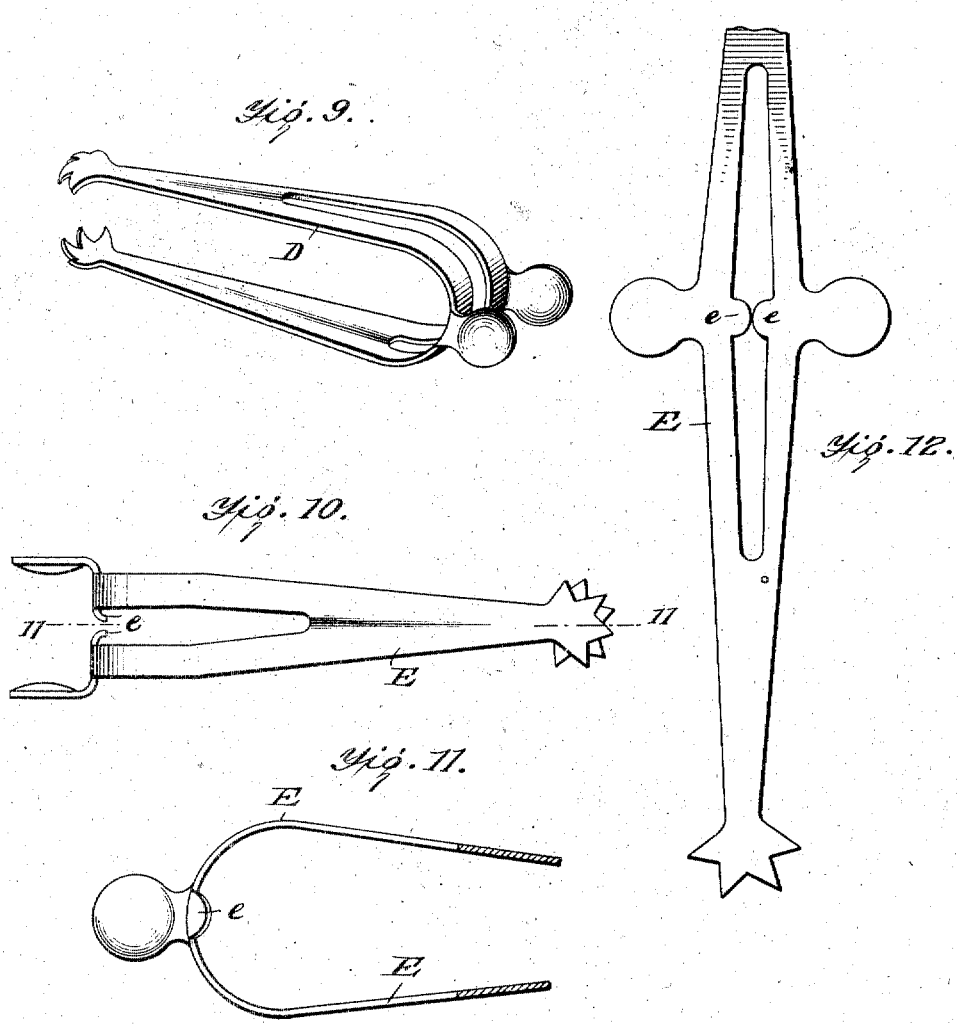

W. V. GILBERT.
RESILIENT COMPOUND LEVER.
APPLICATION FILED SEPT. 15, 1909.
985,755.
Patented Feb. 28, 1911.
3 SHEETS—SHEET 3.
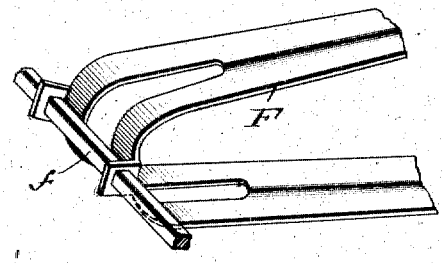
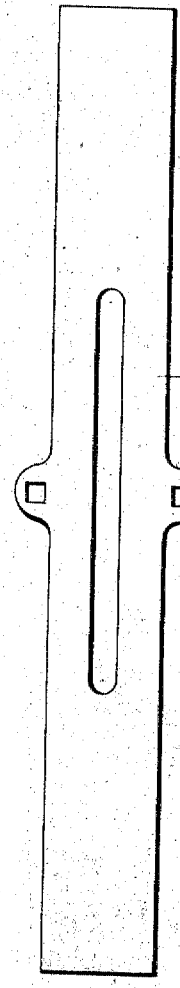
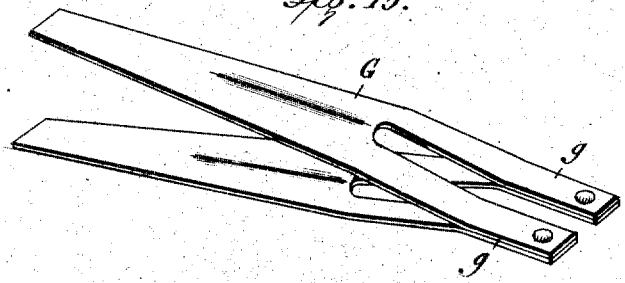
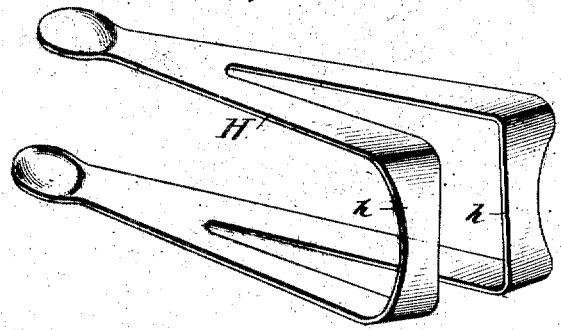
WITNESSES
INVENTOR
WALTER V. GILBERT
BY
ATTORNEYS

UNITED STATES PATENT OFFICE.

WALTER VILLA GILBERT, OF LONDON, ENGLAND.

RESILIENT COMPOUND LEVER.

985,755.     Specification of Letters Patent.     Patented Feb. 28, 1911.

Original application filed June 29, 1908, Serial No. 440,891. Divided and this application filed September 15, 1909. Serial No. 517,896.

*To all whom it may concern:*

Be it known that I, WALTER V. GILBERT, a subject of the King of Great Britain and Ireland, and residing in London, in the county of Middlesex, England, have made certain new and useful Improvements in Resilient Compound Levers, of which the following is a specification.

This is a division of application No. 440,891.

This invention relates to resilient compound levers formed of spring material and having opposing members, hereinafter referred to as lever arms, and a back part connecting the lever arms and being so constructed that when the back part is subjected to lateral compression applied to its ends the said arms are caused to move in another direction, that is to say, approach each other at their free ends, and when such part is released from pressure, the device resumes, or springs back to, its normal form or condition. Resilient devices operating in such manner are described in several Letters Patent of the United States issued to me, noticeably in No. 833,042, dated October 9, 1906, and No. 837,217, dated November 27, 1906, said devices being formed by bowing a blank of resilient sheet metal or other suitable spring material, the extended and opposing members constituting the lever arms being thus connected by a bowed back which is transversely indented so as to produce angularly disposed outwardly tapering components whose angle to each other is varied when their apical ends are subjected to compression, and thus caused to approach each other, which in turn causes the lever arms to approach each other, the said arms resuming their normal open position when the device is released from such compression.

The present invention has for its objects to enable such devices to be made so that an increased variety of motions can be given to the lever arms of such devices by appropriate manipulations of the back part thereof in various directions, to enable the back part to be made in a variety of shapes some having specific functional value, to enable the back part to be reduced in size, and to provide devices of the nature specified which will require a lesser power for effecting their actuation, to the end that the utility and practical applications of such compound levers may be extended.

To these ends, the invention is characterized by forming such compound levers with a back part divided transversely by an opening or slot which also extends well into the lever arms toward their free ends, whereby the back part and the adjacent portions or rear ends of the lever arms have a bifurcated formation, the opposite sides or members of the fork being adapted to be pressed together or toward each other laterally, while the outer or free end part of each lever arm is left entire or undivided by such opening or slot.

The improved device may be made in a considerable variety of forms adapted for various functions, and, by way of example, is widely applicable for various holding devices, some of which are hereinafter described, and for operating various toy structures, for example, such as, or resembling, those described in United States Letters Patent No. 837,216, and No. 837,217, dated November 27, 1906, and No. 846,560, dated March 12, 1907, granted to me.

The invention is hereinafter described with reference to the accompanying drawings, in which—

Figures 1, 2 and 3, are respectively, side, plan, and perspective views of a form of the device which is adapted for use as sugar tongs or for analogous purposes. Fig. 4 is a plan view of the blank from which the device shown in Figs. 1 and 2 is formed. Figs. 5 and 6 are side and perspective views of a modified form of the device in which the back part is reduced in size or in other words in which the rear ends of the lever arms are not spaced apart but are directly connected being flat and pressed against each other. Fig. 7 is a cross section on line 7—7 of the form shown in Fig. 5. Fig. 8 is a perspective view of another modification in which the members composing the back are crossed diagonally and are vertically straight. Figs. 9 and 10 are perspective and plan views showing various modifications of the device. Fig. 11 is a longitudinal section on line 11—11 of Fig. 10, and Fig. 12 is a plan view of the blank from which the form shown in Fig. 10 is made. Fig. 13 is a perspective view of the device in connection with a bar that may be employed for guiding the compressible members of the fork and also for supporting the device in any desired position.

Fig. 14 is a plan view of the blank from which the said device is formed. Figs. 15 and 16 are perspective views showing further modifications of the device.

To clearly distinguish the several forms of my invention illustrated in the drawings, I have indicated them *seriatim* by capital letters A to H inclusive.

As before indicated Figs. 1 to 3, inclusive, illustrate the device in a form A adapted to serve as tongs for seizing and holding lumps of sugar, pickles or various other articles, and which may be made on a small scale as indicated in Fig. 3, or upon a large scale, as conditions may require. The lever arms $a$ are provided exteriorly with a rib or convexity $a^3$ the same extending longitudinally from the slot $a^2$ to the claws $a^5$. This arrangement of the ribs or convexities $a^3$ assists to induce the closing of the device when lateral pressure is applied to the lugs or ears $a^4$ in direction of the arrows, Fig. 2, the toothed jaws or claws $a^5$ being thus caused to approach each other so as to seize and hold an object between them, as illustrated in Fig. 3. The rib being raised away from the inner side of the lever arms, they are necessarily concave toward each other on said inner side. Each of the back forked members, which in this case are curved, is provided on the outer side with a lug or ear $a^4$. The lugs or ears project backward and stand nearly parallel and serve as points for application of the lateral compression by means of thumb and finger. The direction in which pressure is applied is indicated by arrows in Fig. 2, and the effect is to cause the lever arms $a$ to close together as shown in Fig. 3, but when the pressure is released they will obviously open apart or resume their normal position shown in Fig. 1, by reason of the resiliency of the device. The closing together of the lever arms when pressure is applied at the back of the device in direction and manner aforesaid is due mainly to the rib $a^3$ in the lever arms, or, in other words, to their concavity toward each other. Fig. 4 illustrates the blank from which the described device is formed, the blank being preferably a piece of thin spring sheet metal, but it will be understood that I do not propose to restrict myself to a particular material.

Figs. 5 to 7 inclusive, illustrate another form B of the device, the lever arms $b$ diverging from the back part $b'$ and, instead of being bowed, the bifurcated rear ends of the lever arms are folded flat together to form the back part, that is to say, they are not spaced apart or intervened at their rear ends as are the devices shown in Figs. 1, 2, 3, 8 and 16. Lateral compression applied to the outer sides of the forks $b$ will cause the lever arms or jaws to approach each other as in the case of form A. The functional value of forming the device with the back parts thereof reduced in size in this manner is that such construction enables the device to be readily inserted and secured in or to handles of small cross sectional dimensions.

In Fig. 8 I illustrate still another form C of the device, in which the back is composed of the separated or forked portions $c$ crossing each other diagonally and is made straight vertically. By applying compression laterally, the lever arms will be caused to approach each other as in the forms A, B, before described. In constructing this form, one of the forked crossed portions $c$ is necessarily divided and separated transversely, in the blank, and the separated ends are subsequently connected by another short separate piece which may be soldered to the integral portions.

In some cases the slot may be made to extend farther into one lever arm than the other as shown in form D, Fig. 9, by which the arm having the longer slot has a wider radius of action under actuation of the device. Where, say, the back is of thin material, the inner mid parts of the back members may be provided with lugs $e$ or the like, as shown in form E Figs. 10, 11 and 12, in order to prevent the back members folding one under or within the other, or to keep them spaced at a desired distance apart, or in other words to act as a brake.

In Fig. 13, form F, I show a guide bar $f$ passing through the lugs or ears. This holds the bifurcated back members in alinement when compressed. The bar can also be made polygonal or else oval in cross section, in order to hold the device horizontal or in any other position, or in brief prevent rotation. It is thus distinguished from the rod which connects the ends of the bowed back of the device covered by my foundation Patent No. 833,042, which rod serves to limit the movements of the back members from each other and cannot prevent rotary movement of the device. Fig. 14 shows the blank from which the device shown in Fig. 13 is made.

The device may not only be made integral but may also be constructed of a number of pieces suitably connected together as shown in Fig. 15. In this form of construction G, as in the form shown in Fig. 5, the back part $g$ is differently formed, in that, the rear ends of the lever arms instead of being intervened, or in other words spaced apart from each other, lie close together or else flat upon each other. In this case the free ends of the lever arms are closed together by applying lateral compression to the edges of the rear ends thereof in the direction of the arrows, Fig. 2.

The form H shown in Fig. 16 is constructed on the same general principle as the forms already described, it being adapted to be closed when lateral pressure is applied to the back part $h$. The back of this device, like the device shown in Fig. 8, is straight vertically, instead of being curved as in Figs. 1 to 3. The lever arms are ribbed longitudinally to a very slight degree, since with the slot extended and the back also extended vertically, as shown, it is practicable to cause the free ends of the arms to close by lateral pressure applied to the back $h$ when there is but a slight predetermining inclination of the sides of the lever arms toward the longitudinal midparts thereof.

From the foregoing description and the illustrations, it is apparent that the improved device may be modified in various ways, to adapt it to particular uses; also that the operation of the device may be confined to a given field of action, as for example in Fig. 13.

The extended slot or bifurcation with which the various forms of the device illustrated in the present case are provided, is functionally distinguished from the holes shown in the backs of my aforesaid patents, which do not merge or at least but very slightly into the lever arms, their function being to prevent the otherwise unavoidable cracking, and radiation of cracks, from the ends of the indent in the back along the lines of jointure between the back proper and the wings or lever arms. Secondarily, such holes enable the indent of the back to be formed less angular so that it is less liable to crack in bending when the device is in course of formation or under actuation.

The slot or slots in the present invention enable the back part to be reduced in size and also to be made in a variety of different shapes as indicated.

What I claim is:—

1. A resilient device embodying the principle of a compound lever, the same comprising concaved lever arms arranged opposite each other the free ends of which are spaced well apart and a back part which connects said arms, the back part being provided with a slot or opening that extends well into the said arms thus dividing the back part into two laterally opposed members which are free to be pressed inward toward each other whereupon the free ends of the lever arms will move toward each other, substantially as shown and described.

2. A resilient device embodying the principle of a compound lever, the same comprising lever arms arranged opposite each other and a back part which connects them and is provided with a slot or opening that extends well into the said arms, the latter having each a central longitudinal rib located between the ends of the slot and free end of the arm the ribs being concave toward each other, substantially as shown and described.

3. A resilient device embodying the principle of a compound lever, the same comprising lever arms arranged opposite each other and a back part which connects them and is provided with a slot or opening that extends well into the said arms, the latter having a longitudinal rib that extends from said slot toward a point near the free ends of the arms the ribs being concave toward each other, substantially as shown and described.

4. In a device of the character described, the combination of an arched body comprising longitudinally disposed interspaced loops, arms into which the loops merge, engaging members upon the arms, and ears upon the loops.

5. In a device of the character described, the combination of an arched body comprising longitudinally disposed loops, arms into which the loops merge, engaging members upon the arms, and vertical ears upon the lateral edges of the loops.

6. In a device of the character described, the combination of an arched body comprising longitudinally disposed interspaced loops, arms concavo convex in cross section, into which the loops merge, engaging members upon the free ends of the arms, and ears upon the loops.

WALTER VILLA GILBERT.

Witnesses:
 REINHARD BRACHT,
 JOHN BEER.